US008383232B2

(12) United States Patent
Nellis et al.

(10) Patent No.: US 8,383,232 B2
(45) Date of Patent: Feb. 26, 2013

(54) FOAMBOARD SUBSTRATE FOR USE WITH DIGITAL IMAGING SYSTEMS

(75) Inventors: Gail Moore Nellis, Statesville, NC (US); Candace L. Overcash, Statesville, NC (US); Constance Henshaw, Milford, CT (US); Christopher J. Domanski, Mocksville, NC (US)

(73) Assignee: Elmer's Products, Inc., Westerville, OH (US)

( * ) Notice: Subject to any disclaimer, the term of this patent is extended or adjusted under 35 U.S.C. 154(b) by 263 days.

(21) Appl. No.: 12/753,979

(22) Filed: Apr. 5, 2010

(65) Prior Publication Data

US 2010/0255278 A1 Oct. 7, 2010

Related U.S. Application Data

(60) Provisional application No. 61/166,436, filed on Apr. 3, 2009.

(51) Int. Cl.
*B32B 7/02* (2006.01)

(52) U.S. Cl. .................... 428/220; 428/32.1; 428/211.1; 428/212; 428/216; 428/332; 428/411.1; 428/537.5

(58) Field of Classification Search ................. 428/32.1, 428/211.1, 212, 220, 216, 304, 332, 411.1, 428/537.5

See application file for complete search history.

(56) References Cited

U.S. PATENT DOCUMENTS

| | | | | |
|---|---|---|---|---|
| 4,576,865 | A * | 3/1986 | Akao | 428/335 |
| 2003/0173716 | A1 | 9/2003 | Lu | |
| 2006/0003114 | A1 | 1/2006 | Enlow et al. | |
| 2006/0147657 | A1 | 7/2006 | Loeb | |
| 2009/0025587 | A1 | 1/2009 | Verlinden et al. | |

OTHER PUBLICATIONS

International Search Report and Written Opinion received in PCT/US2010/029901.

Kapa Foam Board Brochure, 3A Composites GmbH, Kirfernweg 10, 49090 Osnabruck, Germany, Aug. 2011.

* cited by examiner

*Primary Examiner* — Maria Veronica Ewald
*Assistant Examiner* — Lawrence Ferguson
(74) *Attorney, Agent, or Firm* — McNees Wallace & Nurick LLC

(57) ABSTRACT

A printing substrate is provided, wherein the printing substrate includes a top layer; a middle layer, wherein the middle layer is attached to the top layer, and wherein the middle layer further includes a material that is different than the material of the top layer; and a bottom layer, wherein the bottom layer is attached to the middle layer, and wherein the bottom layer further includes a material that is different than the material of the middle layer and a material that is the same as the material of the top layer; and wherein the printing substrate is adapted specifically for use with use with digital imaging systems such as large, flatbed digital printers and the like.

4 Claims, 3 Drawing Sheets

FOAMBOARD SUBSTRATE FOR USE WITH DIGITAL IMAGING SYSTEMS

CROSS-REFERENCE TO RELATED APPLICATIONS

This patent application claims the benefit of U.S. Provisional Patent Application Ser. No. 61/166,436 filed on Apr. 3, 2009 and entitled "Foamboard Substrate for Use with Digital Printers," the disclosure of which is hereby incorporated by reference herein in its entirety and made part of the present U.S. utility patent application for all purposes.

BACKGROUND OF THE INVENTION

The present invention relates generally to substrates for use with digital printers, and more specifically to a multi-layered, foam-paper substrate that is compatible with large flatbed digital printers and digital printing techniques.

Digital imaging systems are commonplace in the modern business world and such systems are frequently used both for small scale printing jobs and for printing jobs that require larger formats such as signs and displays. Prior art substrates used with digital printers are often not appropriate for printing jobs that require larger formats due to a lack of rigidity, poor finishing quality, lack of uniformity in the printing surface, or other structural or compositional deficiencies. Thus, there is a need for a larger-scale printing substrate that is compatible with large flatbed digital printers and the like.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a substrate for use with digital imaging systems is provided. This substrate includes: a top layer, a middle layer, and a bottom layer. The top layer further includes (i) glossy paper having a weight of about 60 pounds; (ii) low density polyethylene and binder having a thickness of about 0.7 mil; (iii) 16-pt clay coated solid bleached sulphate paper; and (iv) ethylene vinyl acetate having a thickness of about 1.25 mil. The middle layer further includes foam of the type used in known foamboard and foamcore products. The bottom layer further includes: (i) ethylene vinyl acetate having a thickness of about 1.25 mil; (ii) 16-pt clay coated solid bleached sulphate paper; (iii) low density polyethylene and binder having a thickness of about 0.7 mil; and (iv) glossy paper having a weight of about 60 pounds.

In accordance with another aspect of the present invention, a substrate for use with digital imaging systems is provided. This substrate also includes a top layer, a middle layer, and a bottom layer. The top layer further includes: (i) canvas; (ii) low density polyethylene and binder having a thickness of about 0.75 mil; (iii) 16-18 pt base paper; and (iv) ethylene vinyl acetate having a thickness of about 1.25 mil. The middle layer further includes foam of the type used in known foamboard and foam core products. The bottom layer further includes: (i) ethylene vinyl acetate having a thickness of about 1.25 mil; (ii) 16-18 pt base paper; (iii) low density polyethylene and binder having a thickness of about 0.75 mil; and (iv) canvas.

In yet another aspect of this invention, a substrate for use with digital imaging systems is provided. This substrate also includes a top layer, a middle layer, and a bottom layer. The top layer further includes unbleached, uncoated, high-strength paperboard having a weight of about 130 pounds. The middle layer further includes foam of the type used in known foamboard and foam core products. The top layer further includes unbleached, uncoated, high-strength paperboard having a weight of about 130 pounds.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The printing substrate of the present invention typically includes a top layer; a middle layer, wherein the middle layer is attached to the top layer, and wherein the middle layer further includes a material that is different than the material of the top layer; and a bottom layer, wherein the bottom layer is attached to the middle layer, and wherein the bottom layer further includes a material that is different than the material of the middle layer and a material that is the same as the material of the top layer; and wherein the printing substrate is adapted specifically for use with use with digital imaging systems such as large, flatbed digital printers and the like. With reference now to the Figures, one or more specific embodiments of this invention shall be described in greater detail.

Figure 1:
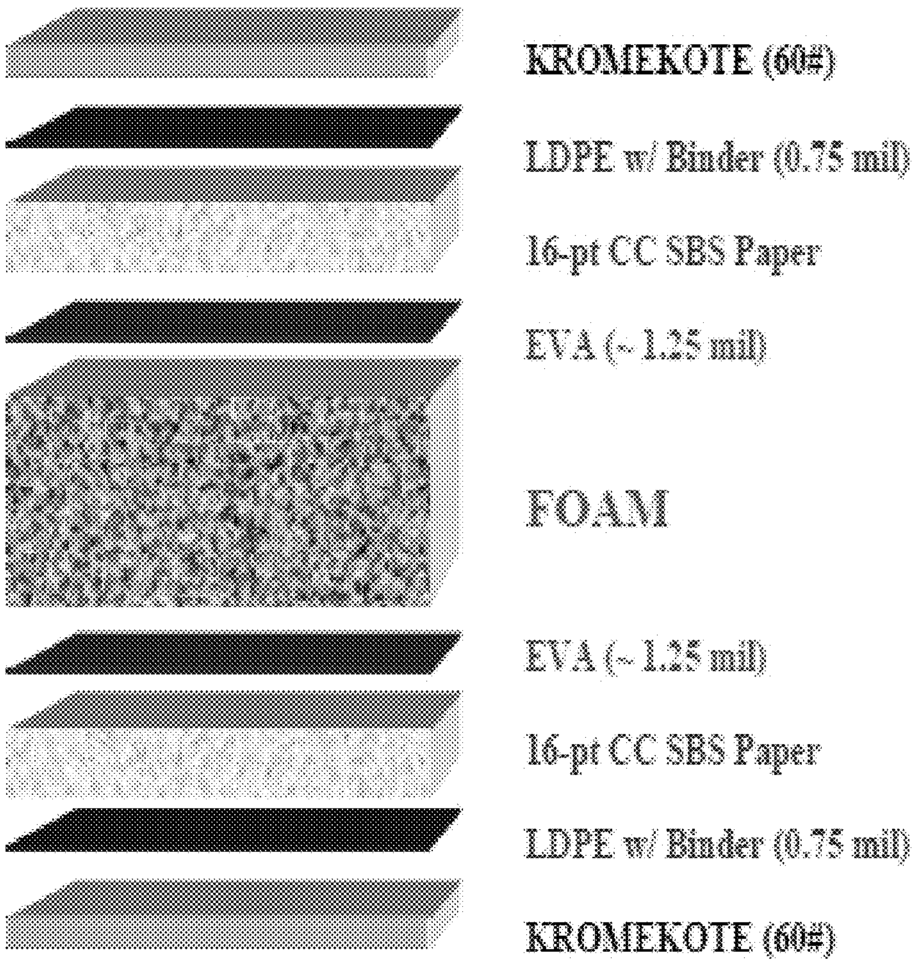
FIG. 1 is an exploded, perspective view of a first exemplary embodiment of the printing substrate of the present invention.

The assembly and composition of a first exemplary embodiment of the substrate of present invention is shown in FIG. 1 and is referred to as "MightyPrint-Glossy". This substrate includes a top layer, a middle layer, and a bottom layer. The top layer further includes: (i) glossy paper, such as KROMEKOTE, having a weight of about 60 pounds; (ii) low density polyethylene (LDPE) and binder having a thickness of about 0.7 mil; (iii) 16-pt clay coated solid bleached sulphate (SBS) paper; and (iv) ethylene vinyl acetate (EVA) having a thickness of about 1.25 mil. The middle layer is attached to the top layer further includes a white rigid polystyrene core of about 0.25 inches in thickness. The bottom layer is attached to the middle layer and further includes (i) ethylene vinyl acetate (EVA) having a thickness of about 1.25 mil; (ii) 16-pt clay coated solid bleached sulphate (SBS) paper; (iii) low density polyethylene (LDPE) and binder having a thickness of about 0.7 mil; and (iv) glossy paper, such as KROMEKOTE, having a weight of about 60 pounds. The glossy surface of this embodiment makes the traditional time-consuming process of achieving a high gloss surface by either applying a liquid laminate or printing on a high gloss paper and mounting to a board unnecessary.

Figure 2:
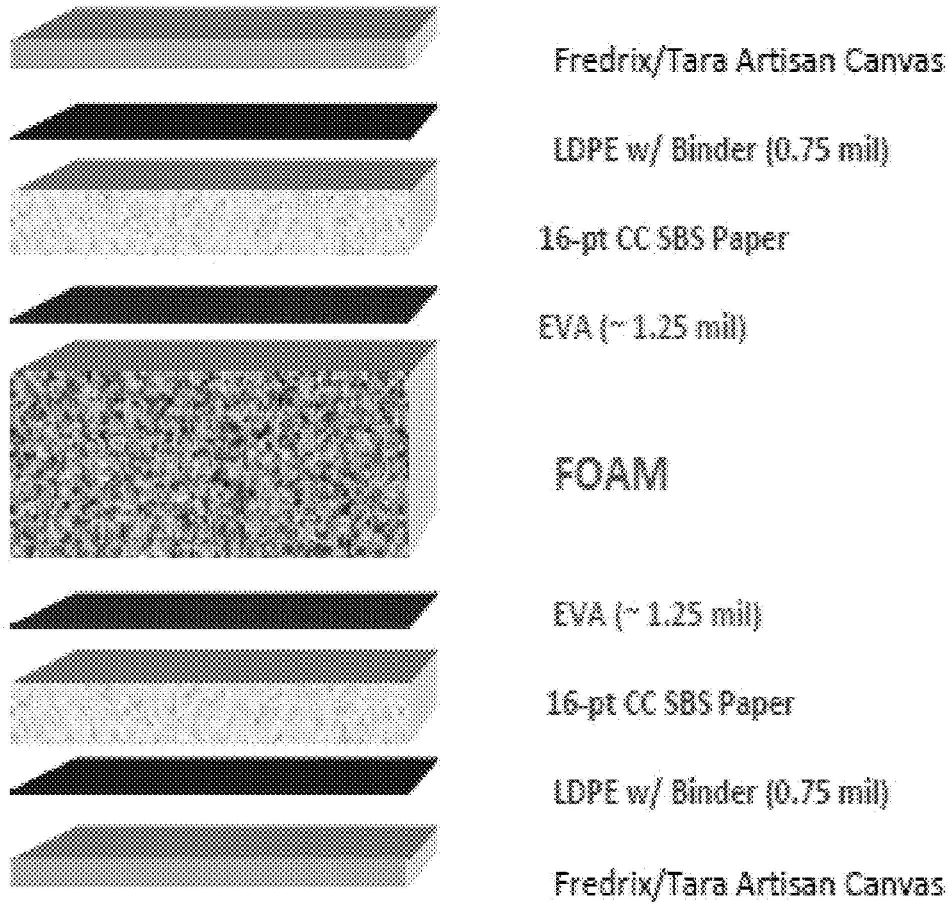
FIG. 2 is an exploded, perspective view of a second exemplary embodiment of the printing substrate of the present invention.

The assembly and composition of a second exemplary embodiment of the substrate of present invention is shown in FIG. 2 and is referred to as "MightyPrint-Canvas". This substrate also includes a top layer, a middle layer, and a bottom layer. The top layer further includes: (i) Fredrix/Tara Artisan canvas; (ii) low density polyethylene (LDPE) and binder having a thickness of about 0.75 mil; (iii) 16-18 pt base paper; and (iv) ethylene vinyl acetate (EVA) having a thickness of about 1.25 mil. The middle layer is attached to the top layer further includes a white rigid polystyrene core of about 0.25 inches in thickness. The bottom layer further includes: (i) ethylene vinyl acetate (EVA) having a thickness of about 1.25 mil; (ii) 16-18 pt base paper; (iii) low density polyethylene (LDPE) and binder having a thickness of about 0.75 mil; and (iv) Fredrix/Tara Artisan canvas. The textured surface of this embodiment enriches and enhances the artistic qualities of printed portraits, photo-graphics and painted images.

Figure 3:
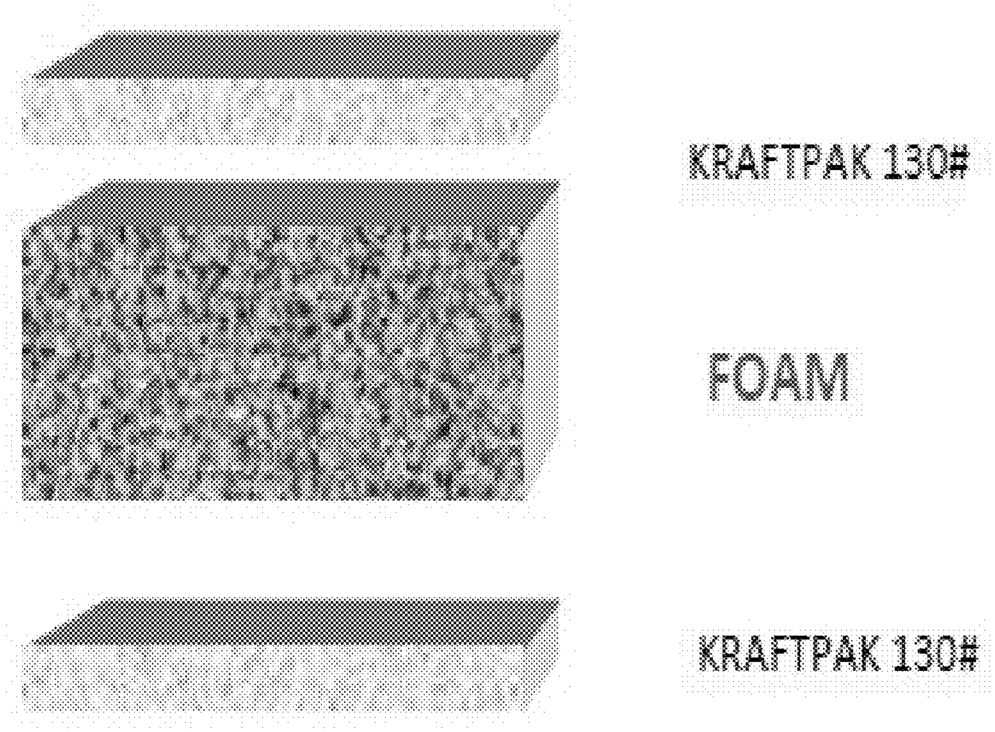
FIG. 3 is an exploded, perspective view of a third exemplary embodiment of the printing substrate of the present invention.

The assembly and composition of a third exemplary embodiment of the substrate of present invention is shown in FIG. 3 and is referred to as "MightyPrint-Premier Kraft". This substrate also includes a top layer, a middle layer, and a bottom layer. The top layer further includes unbleached, uncoated, high-strength paperboard having a weight of about 130 pounds, such as KRAFTPAK 130#. The middle layer is attached to the top layer further includes a white rigid polystyrene core of about 0.25 inches in thickness. The bottom layer further includes unbleached, uncoated, high-strength paperboard, such as KRAFTPAK 130#. The warm undertone of this embodiment creates unique color nuances for the images being printed.

In general terms, the process for manufacturing an exemplary embodiment of the present invention includes the following components and steps. The foam component includes high heat polystyrene (HHPS) which is extruded on a large (⅝") foam extruder through an annular (tubular) shaped die. The controls involved include a foam gauge mechanically controlled by a choke ring (for resisting polymer flow) and an adjustable die lip gap. Both controls can be performed on line; thus making it unnecessary to break the foam web to make any desired changes. The foam is extruded as large tube is then split into two symmetrical webs which are then thermally fused together with hot air. This heated/hot air is typically generated by natural gas burners. A fusion spline may help promote rigidity. Fusion of the symmetrical webs counteracts any circular-shaped memory in each sheet and provides a flatter, more rigid composite. Air is blown in between the two webs, and then composite web is immediately run through a series of rollers to complete bonding process. As further described below, the paper component is a composite of two papers and two adhesive layers.

Currently available products are typically saturated with undesirable chemicals such as melamine and urea formaldehyde. The exemplary embodiments of the present invention described herein include none of these chemicals. The saturation of such products also makes the paper very brittle and difficult to work with and the sharp edges and corners found thereon may require gloves for handling. MightyPrint's double adhesive layers provide an easier-to-cut board without these limitations. The present invention is compatible with at least the following printers: Gerber, EFI/VuTek, HP, Oce, and Gandinnovation, and the present invention is manufactured in a variety of finishes including glossy, matte, canvas, and photo.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A substrate for use with digital imaging systems, comprising:

(a) a top layer, wherein the top layer further includes:
  (i) glossy paper having a weight of about 60 pounds;
  (ii) low density polyethylene and binder having a thickness of about 0.7 mil;
  (iii) 16-pt clay coated solid bleached sulphate paper; and
  (iv) ethylene vinyl acetate having a thickness of about 1.25 mil; and (b) a middle layer, wherein the middle layer further includes a rigid polystyrene core about 0.25 inches in thickness; and (c) a bottom layer, wherein the bottom layer further includes:
  (i) ethylene vinyl acetate having a thickness of about 1.25 mil;
  (ii) 16-pt clay coated solid bleached sulphate paper;
  (iii) low density polyethylene and binder having a thickness of about 0.7 mil; and
  (iv) glossy paper having a weight of about 60 pounds.

2. The substrate of claim 1, where in the digital imaging system further includes a flatbed digital printer.

3. A substrate for use with digital imaging systems, comprising:

(a) a top layer, wherein the top layer further includes:
  (i) canvas;
  (ii) low density polyethylene and binder having a thickness of about 0.75 mil;
  (iii) 16-18 pt base paper; and
  (iv) ethylene vinyl acetate having a thickness of about 1.25 mil; and (b) a middle layer, wherein the middle layer further includes a rigid polystyrene core about 0.25 inches in thickness; and (c) a bottom layer, wherein the bottom layer further includes:
  (i) ethylene vinyl acetate having a thickness of about 1.25 mil;
  (ii) 16-18 pt base paper;
  (iii) low density polyethylene and binder having a thickness of about 0.75 mil; and
  (iv) canvas.

4. The substrate of claim 3, where in the digital imaging system further includes a flatbed digital printer.

* * * * *